United States Patent Office 3,183,111
Patented May 11, 1965

3,183,111
BARIUM TITANIUM BORATE, PIGMENTS CONTAINING THE SAME, AND PROCESSES FOR THEIR PRODUCTION
Stanley J. Buckman, Raleigh, and John D. Pera, Memphis, Tenn., assignors to Buckman Laboratories, Inc., Memphis, Tenn., a corporation of Tennessee
No Drawing. Filed Jan. 23, 1961, Ser. No. 83,903
The portion of the term of the patent subsequent to Apr. 15, 1980, has been disclaimed
6 Claims. (Cl. 106—299)

The present invention relates to barium titanium borate and new pigments containing or consisting predominantly of barium titanium borate, which pigments are characterized by greater resistance to leaching by water, and a higher refractive index than heretofore known barium borate pigments, such as barium metaborate and silica-coated barium metaborate pigments, and processes of producing such pigments.

Barium borates, particularly barium metaborate, when added as pigments to paint vehicles, produce paints whose films are characterized by increased resistance to deterioration or disfiguration by the growth and proliferation of microorganisms and to associated dirt collection. Oil paints containing titanium dioxide or other pigments, whose films are normally susceptible to chalking, that is, the evolution of loose removable powder at or just beneath the surface of the film, become more resistant to such chalking when a barium borate pigment is included in the paint. Such uses of barium borates, including barium borosilicate, and advantages of paints containing such pigments are more fully described in U.S. Patent No. 2,818,344.

When used in water-emulsion paints, barium borates have a tendency to form larger crystalline hydrated particles and are more soluble in the aqueous phases of such emulsion paints than in drying oils or other organic vehicles or solvents. By coating barium metaborate particles with hydrated amorphous silica, as described in United States patent application Serial No. 859,104, filed December 14, 1959, now Patent No. 3,033,700, pigment particles can be obtained which are less leachable by water than are barium metaborate particles. Such silica-coated barium metaborate pigments retain to a substantial degree the desirable fungitoxic effectiveness of uncoated barium metaborate pigments in paint films. The solubility of barium metaborate in water at 20° C. is approximately 0.7 gram per 100 milliliters, while the total quantity of solids which is extractable or leachable from silica-coated barium metaborate pigments by water to form a saturated solution is not more than 0.3 gram per 100 milliliters of water. When the pure barium titanium borate of the present invention is leached with water, dissolved substances (assayed as BaO and $B_2O_3$) in amounts of the order of 0.005 gram per 100 milliliters are found in the extracts. The term "leaching" is used herein in its restricted sense to refer only to the removal of components of a mixture or of a compound by percolation or extraction processes.

The principal object of the present invention is to provide a white solid composition of matter which, when embodied as a pigment in a dried paint film, will release barium and borate ions at a slower rate than uncoated or silica-coated barium metaborate, and that is also consequently less susceptible to leaching from paint films by rain or water. An ultimate object of the present invention is to provide a paint that will deposit films that are resistant for longer periods to disfiguration by mold growth and associated dirt collection than are films deposited from paints preserved with uncoated or silica-coated barium metaborate pigments. Another object of the present invention is to provide a pigment having the desirable characteristics of barium borates which, however, is more suitable for use in aqueous emulsion paints and in aqueous compositions for the coating of paper, textiles, and similar materials. Other objects and advantages of the present invention, some of which are referred to hereinafter, will be apparent to those skilled in the art to which it pertains.

The present invention is based upon the discovery that barium metaborate forms a crystalline compound with titanium dioxide that is much less readily leached by water than barium metaborate, barium borosilicate, or silica-coated barium metaborate, yet is not so insoluble and inert as barium sulfate. Pigments consisting of or containing this compound can be used in paints and aqueous coating compositions as preservatives and for other purposes for which more-soluble barium borates were heretofore less suited.

This crystalline compound, which is designated herein as barium titanium borate, may be represented by the empirical Berzelian formula $BaO \cdot TiO_2 \cdot B_2O_3$, which corresponds to a stoichiometric composition of 50.63 percent barium oxide (BaO), 26.38 percent titanium dioxide ($TiO_2$), and 22.99 percent boron trioxide ($B_2O_3$). During leaching the compound appears to hydrolyze slowly to release barium and borate ions, leaving titanium dioxide or other titanium compounds as an insoluble residue. The total amount of barium and boron constituents (assayed as barium oxide and boron trioxide) that are leachable from this compound by water at 25° C. is of the order of 0.005 gram per 100 milliliters, which is only slightly more than the solubility of barium carbonate in water at that temperature.

The melting point of barium titanium borate is $1008 \pm 5°$ C. and its index of refraction is between 1.94 and 1.96, which is greater than that of barium metaborate (1.54 to 1.56), determined microscopically by means of liquids of determinate refractive index (Becke test). Its density is approximately 4.28 grams per cubic centimeter.

In preparing the barium titanium borate and other products of the present invention, the proportions of the reactants are controlled in such manner as to obtain products that consist essentially of barium titanium borate or that contain preselected proportions of barium metaborate together with barium titanium borate.

Although it is possible to prepare compositions having proportions of titanium dioxide greater than that stoichiometrically required to form the specified barium titanium borate (26.38 percent), the excess titanium dioxide in such compositions appears to remain uncombined and does not affect the leachability of the resulting product, which is essentially the same as that of barium titanium borate. However, such products which contain smaller proportions of leachable compounds of barium and boron would consequently become exhausted sooner in a paint film than barium titanium borate.

It is also possible to prepare compositions whose contents of barium oxide and boron trioxide do not conform to the equimolecular ratio represented by barium metaborate. Although such compositions would be expected to contain some barium titanium borate, the nature of the other constituents, and their leachability, could not be predicted or controlled, as is the leachability of the products of this invention.

The products of this invention are consequently to be regarded essentially as the compound designated herein as barium titanium borate, and mixtures of that compound with barium metaborate. Such products may contain small or significant proportions of unreacted starting materials, including barium borates other than barium metaborate, together with impurities or traces of impurities present in or attributable to the particular starting chemical compounds or substances that were used in their production. Impurities may affect the color and the leachability of barium and borate ions from barium titanate borate more than they are likely to affect its other physical and chemical characteristics.

The titanium dioxide content of the products of this invention will not be greater than approximately 26.4 percent of the product by weight. Products having less than this proportion of titanium dioxide will also contain barium metaborate, since the proportion of the barium and boron-containing reactants that is used to produce barium titanium borate is the same as that stoichiometrically required to produce barium metaborate.

Barium titanium borate and pigments composed of mixtures of barium titanium borate and barium metaborate can be prepared conveniently and directly by heating at temperatures in excess of approximately 700° C. mixtures of titanium dioxide and barium metaborate, or mixtures of titanium dioxide and reactants which produce barium metaborate, such as barium hydroxide, barium sulfide, and barium carbonate as sources of barium oxide; and boric acid as a source of boron trioxide. They can also be made by heating mixtures of barium titanate and boron trioxide or substances which produce boron trioxide, such as boric acid.

In such processes, the characteristics of the products depend upon the stoichiometric proportions of the reactants that are used, the temperature of the heating, and the length of the heating period. Generally temperatures within the range between 700° and 1300° C. and periods of heating between approximately 10 minutes and approximately 24 hours are adequate. Since the characteristics of the products remain essentially unchanged when heated for periods longer than are required to produce the desired barium titanium borate at the particular temperature, reference to a maximum period of 24 hours should be regarded as a matter of operational convenience rather than a significant restriction.

One of the preferred processes for producing the products and compound of this invention comprises heating together commingled hydrous titanium dioxide and precipitated barium metaborate. Precipitated barium metaborate may be conveniently prepared by reaction of solutions of barium sulfide or barium hydroxide with solutions of sodium tetraborate. Hydrous titanium dioxide can readily be prepared by hydrolysis of titanium tetrachloride or titanium sulfate.

When the mass of commingled particles of barium metaborate and hydrous titanium dioxide are heated, water will gradually be expelled and, as the temperature rises, the particles will sinter, beginning at approximately 700° C., to become a coherent solid mass without thoroughly fusing or melting together. The term "sintering" is used herein to distinguish from melting by fusion and from calcination, which latter is generally understood in its restricted sense to refer to a process of heating in which larger particles become friable and are reduced to particles of smaller size.

Barium metaborate and titanium dioxide mixtures which have been sintered in this manner contain substantial proportions or may be entirely composed of the barium titanium borate of this invention, dependent upon the size of the individual particles, the temperature, and the period of heating to which they were subjected. As the temperature of heating is raised beyond 900° C., such masses become progressively more coherent and melt to a clear liquid at approximately 1008° C. Although the temperature of the heating may be raised to approximately 1300° C., in practice, and to facilitate subsequent pulverization or grinding, the heating need normally not be conducted to the point of complete fusion of the mass. The products obtained by sintering or melting are further disintegrated to produce particles of suitable sizes for use in the formulation of paints and other compositions such as are referred to herein.

Titanium dioxide from other sources, including commercial grades of anatase titanium dioxide pigments, rutile titanium dioxide pigments, and titanium dioxide ores, may be used in place of the more reactive hydrous products obtained by hydrolysis of titanium tetrachloride or titanium sulfate.

Barium sulfide may be used instead of barium carbonate or barium hydroxide as a source of barium. It may be fused directly with boric acid and titanium dioxide to produce barium titanium borate and other products of this invention, as illustrated in Example 4 hereinafter. Hydrogen sulfide and sulfur dioxide are expelled during the heating of such mixtures.

The characteristics of products produced by any of the processes of this invention are dependent upon the purity of the original reactants and any subsequent purification processes to which the products may be subjected.

EXAMPLE 1

*Production of barium titanium borate from barium carbonate, titanium dioxide, and boric acid by fusion*

(a) PREPARATION OF HYDROUS TITANIUM DIOXIDE

The hydrous titanium dioxide that was used in this and subsequent examples was prepared as follows:

Technical titanium tetrachloride ($TiCl_4$) was added dropwise to a weighed amount of chopped ice contained in a beaker immersed in an ice bath. Sufficient titanium tetrachloride was added so that an amount equivalent to approximately 10 percent by weight of titanium dioxide was present. Aqueous ammonium hydroxide (28 percent $NH_3$ solution) was then added with stirring while the temperature was maintained between 10 and 20° C. until no further precipitation occurred. The precipitated hydrous titanium dioxide was then recovered by filtration and washed with several portions of water until the wash water was essentially free of ammonium and chloride ions. Before use, a sample of this hydrous titanium dioxide was ignited to determine its titanium dioxide ($TiO_2$) content.

(b) MIXING AND FUSING

Stoichiometric quantities of reagent grades of barium carbonate ($BaCO_3$, 197.4 molecular weight), boric acid (2 moles $H_3BO_3$, 61.84 molecular weight), and hydrous titanium dioxide ($TiO_2$, 79.90 molecular weight) prepared as described above, were mixed together by grinding in a mortar and pestle and placed in a platinum crucible. The mixture was then heated in a closed muffle furnace to melting and maintained above melting temperature (approximately 1100° C.) for approximately 1 hour, during which heating the contents of the crucible were swirled periodically to distribute the molten mass, which had a yellow color. During the heating, water and carbon dioxide were expelled. The mass was allowed to crystallize and cool slowly. The fused product, which had a white color after cooling, was then pulverized with a mortar and pestle. As thus prepared, the particles were crystalline under the polarizing microscope and had a refractive index between 1.94 and 1.96.

(c) EXTRACTION OF PRODUCTS WITH WATER TO DETERMINE THEIR LEACHABILITY

The amount of material which is leachable or extractable from the products by water was determined in the following manner: Five (5) grams of the product was placed into 100 milliliters of previously boiled distilled water contained in a stoppered polyethylene bottle, and the suspension was shaken for 20 hours at prevailing room temperature. The clear solution or extract was then separated from the solid residue by filtration and the residue was added to a second quantity of 100 milliliters of water and the suspension again shaken for 20 hours and filtered. The extraction of the product was continued in this manner to observe the constancy of the composition of the successive extracts.

Each of the extracts thus obtained was then analyzed for its content of barium and boron. In the case of the products of this invention, the extracts were free from soluble titanium compounds, indicating that barium titanium borate hydrolyzes slowly in contact with water to liberate barium and borate ions. The extracts were assayed for barium and boron and the results are reported herein as barium oxide (BaO) and boron trioxide ($B_2O_3$) in grams per 100 milliliters of extract.

The results of extractions of the product of this example with water in the foregoing manner were as follows:

| Extraction No. | BaO, grams per 100 milliliters | $B_2O_3$, grams per 100 milliliters |
|---|---|---|
| 1 | 0.076 | 0.056 |
| 2 | 0.057 | 0.045 |
| 3 | 0.018 | 0.015 |
| 4 | 0.0062 | 0.0056 |
| 5 | 0.0032 | 0.0035 |
| 6 | 0.0026 | 0.0030 |
| 7 | 0.0020 | 0.0025 |
| 8 | 0.0016 | 0.0023 |
| 9 | 0.0013 | 0.0020 |
| 10 | 0.0014 | 0.0024 |

(d) X-RAY POWDER DIFFRACTION ANALYSIS

The interplanar spacings observed on examination of the foregoing product by conventional X-ray powder diffraction analytical methods were as follows:

| Interplanar spacing (d values), Angstroms | Relative intensity $I/I_1 \times 100$ |
|---|---|
| 5.53 | 98 |
| 4.24 | 15 |
| 3.88 | 74 |
| 3.00 | 100 |
| 2.91 | 16 |
| 2.74 | 49 |
| 2.63 | 26 |
| 2.52 | 25 |
| 2.29 | 10 |
| 2.16 | 12 |
| 2.11 | 18 |
| 1.86 | 71 |
| 1.82 | 41 |
| 1.61 | 8 |
| 1.54 | 19 |
| 1.37 | 36 |
| 1.13 | 17 |
| 0.99 | 23 |

In the foregoing table, the interplanar spacings or distances between planes in the crystal are expressed in angstroms and represent the $d$ values obtained from the Bragg equation: $n\lambda = 2d \sin \theta$, in which $n$ is the order of diffraction (i.e., 1 or other whole number), $\lambda$ is the wavelength of the X-rays in angstroms, and $\theta$ is the incident angle or one-half the angle of scattering of the rays. The relative intensity ($I/I_1$) is the quotient of the intensity of the particular diffraction line in arbitrary units (I) and the intensity of the strongest line in the same arbitrary units ($I_1$).

The foregoing X-ray diffraction results were obtained by direct measurements with a spectrogoniometer provided with a proportional counter tube, in which the angular scanning was made at a rate of 2 degrees per minute. The X-ray source was a copper target tube the radiation of which was filtered through a nickel disc to produce a radiation having an effective wavelength of 1.54 angstroms.

The foregoing X-ray diffraction data that were obtained for the product of this example differ from those of barium metaborate, barium titanate, and both anatase and rutile titanium dioxides. Since such data are characteristic of the crystal form and spacing, and thus are characteristics of chemical compounds rather than of elements or chemical groups, they conclusively prove that the product that formed is not a mere mixture of the individual starting materials but is a chemical compound. Its X-ray diffraction pattern is believed to be unique and different from that of any other compound whose diffraction data has heretofore been reported or determined.

Although one line (3.00 A.) appeared in the foregoing X-ray diffraction pattern in the same relative intensity that it appears in the X-ray diffraction pattern of barium metaborate, the absence of other relatively strong barium metaborate lines and the presence of lines that are not found in barium metaborate establish that the product is not barium metaborate.

EXAMPLE 2

*Production of fused mixture of barium titanium borate and barium metaborate*

Barium carbonate, hydrous titanium dioxide prepared as described in Example 1, and boric acid were mixed in such proportions as to provide a mixture stoichiometrically equivalent to one mole of titanium dioxide to two moles of each of barium oxide and boron trioxide. This mixture was ground together in a mortar with a pestle and transferred to a platinum crucible in which it was heated for 1 hour in a closed muffle furnace at a temperature of approximately 1100° C. The clear melt on cooling solidified to a white crystalline material which was ground and subjected to leaching tests as described in Example 1(c) hereinbefore. Barium oxide and boron trioxide appeared in initial leachings from this product in the weight ratio of 2.18 to 1. The ratio of barium oxide to boron trioxide by weight in barium metaborate is 2.20 to 1. The weight ratio, as well as the amount of the extracted material, decreased on successive leaching of the product.

The results obtained on leaching were as follows:

| Extraction No. | BaO, Grams per 100 milliliters | $B_2O_3$, Grams per 100 milliliters |
|---|---|---|
| 1 | 0.433 | 0.197 |
| 2 | 0.444 | 0.203 |
| 3 | 0.207 | 0.104 |
| 4 | 0.088 | 0.064 |
| 5 | 0.0397 | 0.0310 |
| 6 | 0.0085 | 0.0067 |
| 7 | 0.0034 | 0.0029 |
| 8 | 0.0027 | 0.0018 |
| 9 | 0.0025 | 0.0021 |
| 10 | 0.0024 | 0.0016 |

The assays of the first extractions indicate that the barium metaborate in the fused product was leaching out of the product at the rate barium metaborate would be expected to leach, and that, after the seventh extraction, the quantities that were leached were those that would be expected to leach from essentially pure barium titanium borate. The residue after 10 leachings was examined and its X-ray powder diffraction pattern was as follows:

| Interplanar spacing (d values), Angstroms | Relative intensity $I/I_1 \times 100$ |
|---|---|
| 5.50 | 18.4 |
| 4.23 | 21.9 |
| 3.86 | 73.7 |
| 3.00 | 100 |
| 2.74 | 9.6 |
| 2.63 | 21.1 |
| 2.52 | 32.4 |
| 2.29 | 13.2 |
| 2.16 | 18.4 |
| 2.11 | 27.2 |
| 1.85 | 43.9 |
| 1.83 | 14.9 |
| 1.61 | 14.9 |
| 1.53 | 14.9 |
| 1.37 | 11.4 |

The foregoing X-ray diffraction data confirmed that the residue after the tenth leaching consisted essentially of barium titanium borate.

Such products as the foregoing, containing barium metaborate together with barium titanium borate, are obviously desirable where an initially high release of barium and borate ions is required, such as in emulsion paints, where preservation of the paint in its original container as well as long-term protection of the paint film against disfiguration by mold growth are desired. Similar relationships are also involved in the production of preservative coatings for paper wrappers and cartons for soap and similar products that are susceptible to deterioration by molds and bacteria.

EXAMPLE 3

*Preparation of sintered barium titanium borate from barium sulfide, hydrous titanium dioxide, and borax*

To an aqueous solution of commercial grade barium sulfide maintained at a temperature between 55 and 60° C. in a flask provided with a stirrer and reflux condenser was added with stirring hydrous titanium dioxide prepared as described in Example 1(a), in an amount equivalent to one mole of $TiO_2$ to each mole of BaS in the solution, followed by an amount of borax pentahydrate ($Na_2B_4O_7 \cdot 5H_2O$) equivalent to one-half mole for each mole of barium sulfide (BaS). Some hydrogen sulfide was liberated during this addition and the reaction mixture became pale yellow in color. The mixture was then heated to 100° C. within 20 minutes and heating was continued at a temperature such that a gentle reflux was maintained for an additional 4 hours, after which it was cooled to 70° C., the solids were separated by filtration, and washed with an amount of water equivalent approximately to the volume of the filtrate.

The product at this point was a white amorphous solid that retained a large proportion of water. When a sample was withdrawn and dried overnight in an oven maintained between 140° and 150° C., and then pulverized with a mortar and pestle, the particles were found to have refractive indices between 1.62 and 1.80, determined microscopically by means of liquids of determinate refractive index. This intermediate product, when leached with water as described hereinbefore in Example 1(c), is not as leachable as barium metaborate nor as non-leachable as barium titanium borate. Results of such leaching tests were as follows:

| Extraction No. | BaO, Grams per 100 milliliters | $B_2O_3$, Grams per 100 milliliters |
|---|---|---|
| 1 | 0.132 | 0.071 |
| 2 | 0.116 | 0.068 |
| 3 | 0.105 | 0.066 |
| 4 | 0.096 | 0.063 |
| 5 | 0.095 | 0.063 |

The dried product thus prepared from barium sulfide, borax, and hydrous titanium dioxide was then heated in a platinum crucible at 900° C. for a period between 2 and 3 hours. The resulting product was not a solid fused mass such as that described in Example 1 hereinbefore, but was a sintered mass of individual granular particles whose surfaces were fused at various points to each other, yet were separated by voids, similar in texture to the porous cinder or ash that forms after the burning of a block of coal. The sintered product, after grinding with a mortar and pestle, consisted of white crystalline particles having refractive indices between 1.94 and 1.96. The sintered barium titanium borate thus prepared when leached with water as described in Example 1(c) produced upon repeated leaching extracts which assayed a total of approximately 0.005 gram per 100 milliliters of barium oxide and boron trioxide, which is essentially the leachability of the product described in Example 1.

EXAMPLE 4

*Production of barium titanium borate from barium sulfide, hydrous titanium dioxide, and boric acid*

A mixture of 12.5 grams of hydrous titanium dioxide prepared by hydrolysis of titanium sulfate and assaying 64.0 percent $TiO_2$ by weight (equivalent to 0.10 mole of $TiO_2$), was ground together with 12.4 grams of boric acid (0.20 mole). This pasty mixture was then transferred to a glass beaker and 120 grams of a 14.1-percent-by-weight solution of a commercial grade of barium sulfide (equivalent to 0.10 mole) was added. Hydrogen sulfide was gradually evolved.

The pasty mixture was then heated on a hotplate. To protect it from air, a glass funnel was inverted and placed in the beaker directly over the surface of the pasty mixture and a stream of nitrogen was charged through the tip of the funnel to provide a blanket of nitrogen gas and permit the evolution of additional amounts of water and hydrogen sulfide. The mixture was then heated on the hotplate to 150° C. and the heating continued for two hours at that temperature until the product appeared to be dry. The dry mixture, in which particles of free sulfur were visible, was then placed in a muffle furnace and heated at a temperature of 700° C. for a period of two hours to oxidize the sulfur and expel it as sulfur dioxide. The resulting mixture was then placed in a platinum crucible and heated therein until fusion occurred, which was at a temperature of approximately 1250° C.

The product of this example was substantially identical in all respects with the barium titanium borate of the prior examples. On extraction with water in the manner described in Example 1(c) hereinbefore, the following leachability results were obtained:

| Extraction No. | BaO, Grams per 100 milliliters | $B_2O_3$, Grams per 100 milliliters |
|---|---|---|
| 1 | 0.143 | 0.170 |
| 2 | 0.047 | 0.049 |
| 3 | 0.010 | 0.010 |
| 4 | 0.007 | 0.007 |
| 5 | 0.008 | 0.007 |
| 6 | 0.004 | 0.004 |
| 7 | 0.004 | 0.004 |
| 8 | 0.004 | 0.004 |
| 9 | 0.003 | 0.004 |
| 10 | 0.003 | 0.003 |

Inasmuch as the foregoing specification comprises preferred embodiments of the invention, which were selected for purposes of illustration, it is to be understood that the invention is not restricted to such specific embodiments, and that modifications, variations, and alternatives, including such as are described or suggested hereinbefore in the section preceding the specific examples or which are required to adapt the processes to the production of larger batches, may be made without departing from the invention, whose scope is limited solely by the appended claims.

What is claimed is:

1. A composition of matter consisting essentially of the compound barium titanium borate having the empirical Berzelian formula $BaO \cdot TiO_2 \cdot B_2O_3$.

2. Solid particles consisting essentially of fused barium titanium borate, having the empirical Berzelian formula $BaO \cdot TiO_2 \cdot B_2O_3$, and barium metaborate, wherein the barium metaborate content varies from 0 to 42.5 weight percent of said solid particles.

3. A process for the production of a homogeneous solid containing barium titanium borate which comprises heating at a temperature between approximately 700° and approximately 1300° C. for a period between approximately 1300° C. for a period between approximately 10 minutes and approximately 24 hours a commingled mixture of the group consisting of (1) mixtures of titanium dioxide and a substance of the group consisting of barium metaborate and mixtures of barium and boron compounds that are convertible by such heating to barium metaborate and (2) mixtures of barium titanate and boron compounds that are convertible by such heating to boron trioxide, in such amounts that the titanium dioxide content of the resulting product does not exceed approximately 26.4 percent by weight.

4. A process for the production of a homogeneous solid containing barium titanium borate which comprises heating at a temperature between approximately 700° and approximately 1300° C. for a period between approximately 10 minutes and approximately 24 hours a commingled mixture of barium metaborate and titanium dioxide containing not more than approximately 26.4 percent of titanium dioxide on a dry weight basis.

5. A process for the production of barium titanium borate which comprises heating together a commingled mixture of barium metaborate and titanium dioxide in approximately equimolecular proportions at a temperature between approximately 700° and approximately 1300° C. for a period between approximately 10 minutes and approximately 24 hours.

6. A process for the production of barium titanium borate having the formula $BaO \cdot TiO_2 \cdot B_2O_3$ which comprises heating together a mixture of barium sulfide, titanium dioxide, and boric acid in the approximate molecular ratio of 1:1:2, respectively, at a temperature between approximately 700° and approximately 1300° C. for a period between approximately 10 minutes and approximately 24 hours thereby forming said barium titanium borate.

References Cited by the Examiner
UNITED STATES PATENTS

| | | | |
|---|---|---|---|
| 2,218,655 | 10/40 | Peterson | 106—299 X |
| 2,737,460 | 3/56 | Werner | 106—300 |
| 2,738,255 | 3/56 | Sullivan et al. | 23—59 |
| 2,739,904 | 3/56 | Frey | 106—299 X |
| 2,744,029 | 5/56 | Kingsbury | 106—300 |
| 2,799,556 | 7/57 | Sullivan et al. | 23—59 |
| 2,875,085 | 2/59 | Morris et al. | 106—299 |
| 3,011,901 | 12/61 | Traub et al. | 106—299 |
| 3,085,893 | 4/63 | Buckman et al. | 23—59 X |

OTHER REFERENCES

Mellor: Comprehensive Treatise on Inorganic and Theoretical Chemistry, Longmans, Green and Co., New York, 1924, vol. V, page 105.

Mellor: Comprehensive Treatise on Inorganic and Theoretical Chemistry, Longmans, Green and Co., New York, 1927, vol. VII, pages 54 and 55.

Remy et al.: "Treatise on Inorganic Chemistry," vol. 2, Elsevier Pub. Co., New York, 1956, pp. 44 and 45. (Copy in Sci. Lib.)

MAURICE A. BRINDISI, *Primary Examiner.*

JOHN H. MACK, GEORGE D. MITCHELL, *Examiners.*

UNITED STATES PATENT OFFICE
CERTIFICATE OF CORRECTION

Patent No. 3,183,111                            May 11, 1965

Stanley J. Buckman et al.

It is hereby certified that error appears in the above numbered patent requiring correction and that the said Letters Patent should read as corrected below.

Column 3, line 4, for "titanate" read -- titanium --; column 8, line 22, for "unil" read -- until --; line 71, strike out "1300° C. for a period between approximately".

Signed and sealed this 21st day of September 1965.

(SEAL)
Attest:

ERNEST W. SWIDER                          EDWARD J. BRENNER
Attesting Officer                             Commissioner of Patents